June 17, 1930.    P. C. HAAS    1,765,231
COMPOSITE GEAR
Filed July 20, 1927
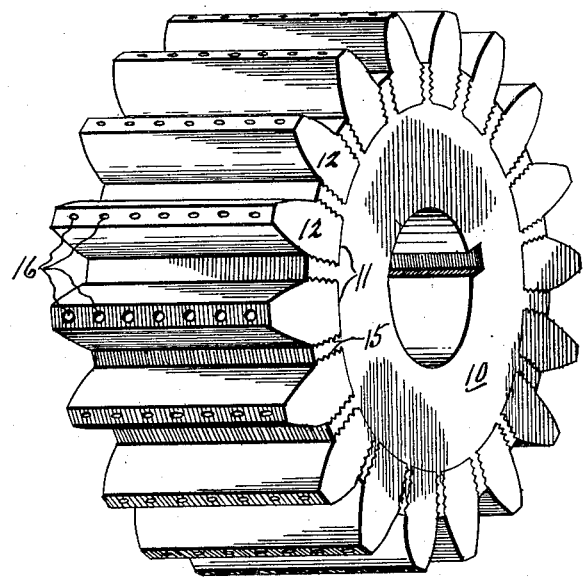
Fig.1.
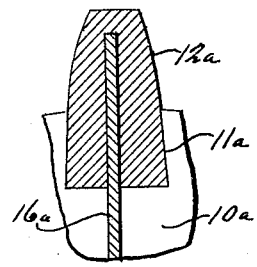
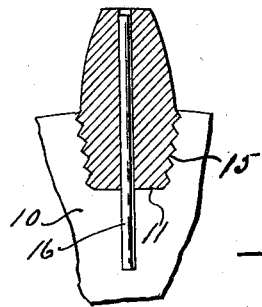
Fig.2.
Fig.3.
INVENTOR,
Paul C. Haas
BY
Francis D. Hardesty
ATTORNEY Patented June 17, 1930

1,765,231

UNITED STATES PATENT OFFICE

PAUL C. HAAS, OF MENDON, MICHIGAN, ASSIGNOR, BY MESNE ASSIGNMENTS, TO CONTINENTAL-DIAMOND FIBRE COMPANY, OF NEWARK, DELAWARE, A CORPORATION OF DELAWARE

COMPOSITE GEAR

Application filed July 20, 1927. Serial No. 207,060.

The present invention relates to gear construction and more especially to the type of gears made of non-metallic material.

Among the objects of the invention is a gear that may be used for heavy duty though not limited to such use.

Another object is to greatly lessen the cost of such without at the same time lessening their efficiency.

Still other objects will readily appear to those skilled in the art upon reference to the following description and accompanying drawing in which:—

Fig. 1 is a perspective view of a gear embodying the present invention;

Fig. 2 is a section through one of the teeth;

Fig. 3 is a similar section showing a modification.

As indicated in the drawing, the gear consists of a metallic body 10 provided with longitudinal slots 11 in its periphery in which slots are set teeth 12 of non-metallic material, preferably of fibrous material, such as layers of cloth, impregnated with and held together by a phenolic condensation product, the whole being produced under conditions of high pressure to give a product having great strength and resistance to wear and corrosion. While this material is preferred it is to be understood that other fibrous non-metallic tooth material may be substituted therefor such as rawhide and others depending somewhat on the duty.

In producing a gear the body 10 is first slotted as stated and the walls of the slots corrugated as indicated at 15. The tooth 12 is then formed and forced endwise into the slot so that it is compelled to conform to the corrugated walls 15.

After the teeth have been forced into the slots, a plurality of holes are drilled radially through the teeth into the body 10 and metal pins 16 driven therein. These pins assist in anchoring the teeth in place and also furnish a reinforcement therefor.

Instead of using pins 16, it is proposed as an alternate to undercut the walls of the slots as shown at 11ª in Fig. 3 and to cut longitudinally narrow slots in the bottom. The teeth will also be slotted so that a plate 16ª may be forced thereinto, to spread the tooth into the undercut. The plate 16ª will like pins 16 serve both as a reinforcement and anchoring means.

Now having described the invention and the preferred form of embodiment thereof, it is to be understood that the said invention is to be limited not to the specific details herein set forth but only by the scope of the claims which follow.

I claim:—

1. A gear including a metallic body portion having openings in the periphery thereof, non-metallic teeth inserted into said openings, and means extending from the teeth and into the body portion for holding the teeth against endwise movement.

2. A gear including a metallic body portion having openings formed in the periphery thereof, the inner edges of said openings being approximately parallel with the axis of the gear, non-metallic teeth inserted in said openings and extending approximately to opposite sides of the gear, and means extending radially from the teeth and into the body portion for reinforcing the teeth and holding them against endwise movement.

3. A gear including a one-piece body portion having a plurality of openings formed therein from side to side, the inner edges of said openings being approximately parallel with the axis of the gear, non-metallic teeth inserted lengthwise into said openings and extending approximately to the side edges of the body portion, the inner edges of the teeth approximately fitting and corresponding with the inner edges of the openings allowing the teeth to be inserted from an outer edge of the gear, and pins extending from the teeth into the body portion to hold the teeth against endwise movement.

4. A gear including a metallic body portion having grooves formed in the periphery thereof, and extending approximately from side to side of the gear, non-metallic teeth secured in said openings and extending approximately to the opposite faces of the gear, each of the peripheral grooves being spaced from the center axis of the gear a distance at least as great as an outer end thereof, permitting the insertion of the teeth from a side of the gear, and means extending from the teeth into the body portion and holding the teeth against endwise displacement.

PAUL C. HAAS.